A. B. DU PONT.
CAR ADAPTED FOR SUBWAY USE.
APPLICATION FILED OCT. 3, 1910.
1,073,106. Patented Sept. 16, 1913.
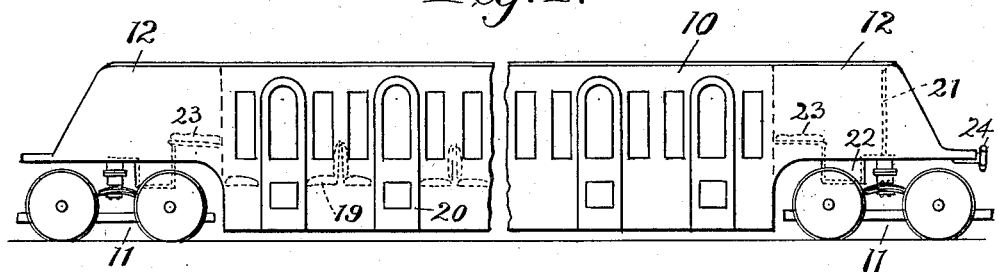
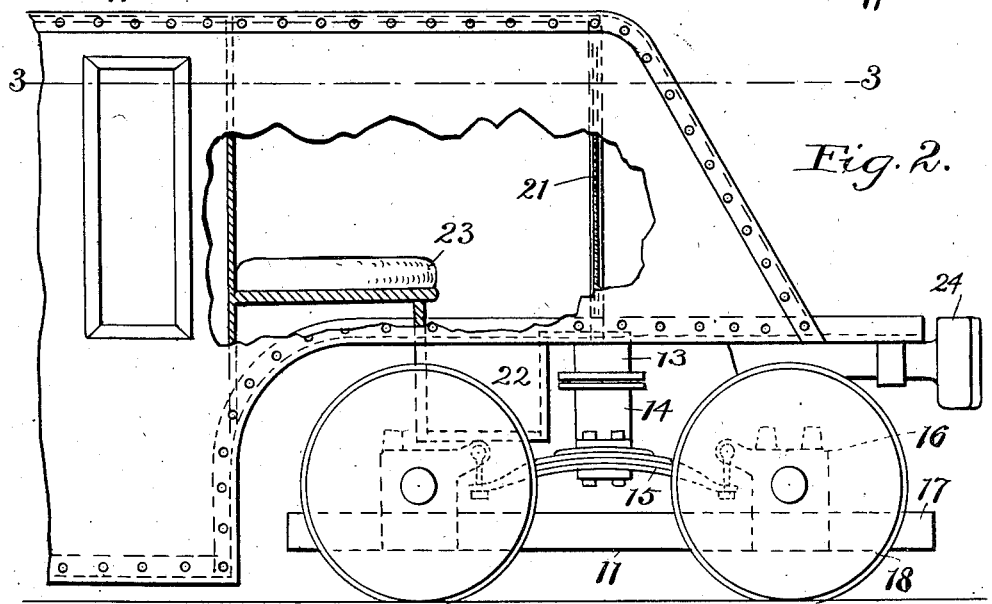
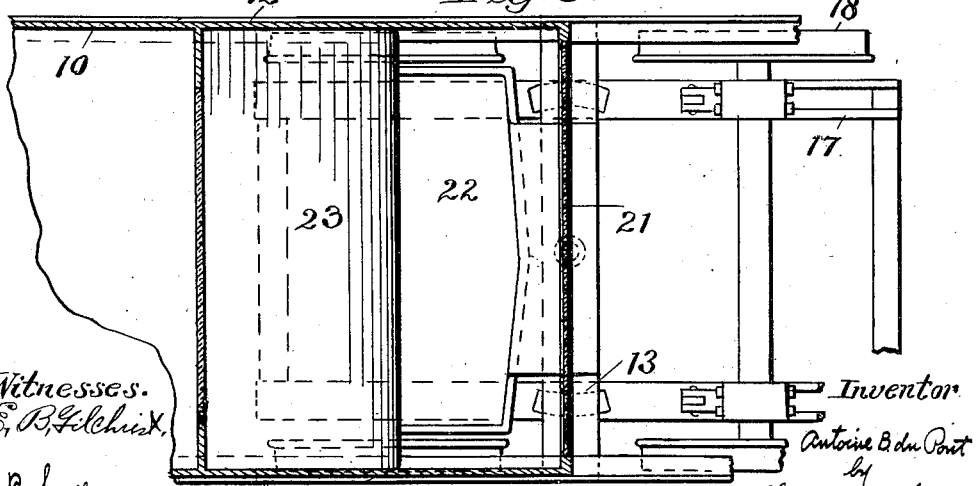

UNITED STATES PATENT OFFICE.

ANTOINE B. DU PONT, OF CLEVELAND, OHIO.

CAR ADAPTED FOR SUBWAY USE.

1,073,106.   Specification of Letters Patent.   Patented Sept. 16, 1913.

Application filed October 3, 1910. Serial No. 584,978.

*To all whom it may concern:*

Be it known that I, ANTOINE B. DU PONT, a citizen of the United States, residing at Cleveland, in the county of Cuyahoga and State of Ohio, have invented a certain new and useful Improvement in Cars Adapted for Subway Use, of which the following is a full, clear, and exact description.

This invention relates to improvements in cars adapted for subway use, and is an improvement over the construction disclosed in my Patent No. 945,247, of Jan. 4th, 1910.

In my patent above referred to, I have shown a car which is designed particularly for subway use, and is constructed especially with the view of obtaining a car which although having a large passenger carrying capacity, has dimensions such that the size and cost of a subway tunnel in which the car is used will be greatly reduced, and will in fact be reduced to such an extent that subways can be used more generally and in localities or communities which heretofore have been deprived of the same, due largely to the prohibitive cost of tunnel constructions. This car, as disclosed in my patent, includes a pair of trucks and a car body with the passenger carrying portion located wholly between the trucks and extending downwardly between the wheels of the same adjacent to the rails of the track, and having at its ends bracket-like extensions which project over the trucks and have swivel or pivotal connections therewith. In this manner, the floor of the car body is made very low and as the top is lowered correspondingly, or an amount such that the interior height is no greater than normal, the height of the car or of the passenger carrying portion can be made considerably less than the height of subway and other cars heretofore employed. Furthermore, by arranging the seats transversely of the car in pairs facing each other and by providing in the sides of the car, for the ingress and egress of passengers, sliding doors opposite the spaces between the pair of seats, all aisle spaces can be done away with and the width of the car can be made substantially the same as the distance between the rails of a standard gage track.

By the use of girder construction in the frame of the car, the length of the car can be made such as to provide ample passenger carrying capacity and also to provide sufficient strength and stiffness to avoid any perceptible sagging when the car is loaded to full capacity, and at the same time, the height and width of the car are such that the dimensions and cost of the subway tunnel is enormously decreased.

In my patent, no special provision is shown for the motorman or motorman's compartment, and the present invention relates particularly to this latter feature.

The object of the invention is to so locate and arrange the motorman's compartment that the latter will not add to the necessary height of the car or in any way be a factor in the determination of the height of the car, and at the same time there will be ample space in the compartment for the comfort of the motorman and for the unhampered discharge of his duties.

The above object is accomplished by arranging the motorman's compartment at one or both ends of the car body in a supporting extension which projects from the passenger carrying portion over the truck and is connected to the latter. Preferably, the compartment is extended downwardly between the wheels of the truck rearwardly of the bolsters, so as to provide ample space for the motorman between the top of the compartment and a seat which may be provided at the rear portion of the compartment over the rear pair of wheels of the truck.

My invention may be further briefly summarized as consisting in certain novel details of construction and combinations and arrangements of parts which will be described in the specification and set forth in the appended claims.

In the figures of the drawing, Figure 1 is a side elevation of the car constructed in accordance with my invention, a portion of the car being broken away; Fig. 2 is an enlarged side elevation of one of the ends of the car, portions being broken away; and Fig. 3 is a horizontal sectional view substantially along the line 3—3 of Fig. 2 looking downward, portions being broken away and omitted.

The car comprises a passenger carrying body 10 and two trucks 11, 11, between which the body 10 is hung or supported, the car body having at its ends extensions 12, 12, which project over the trucks and are connected thereto, these extensions having body bolsters 13 swiveled or pivotally connected in the usual manner to the truck bolsters 14, which in this case are supported on springs 15 connected to journals 16 supported on the truck frame 17, the journals being located on the inner sides of the wheels 18, and the side portions of the truck frame being in this case located below the car axles. The lower portion or bottom of the body 10, is, as shown, very near the rails of the track, and as I prefer that the interior height of the car body be no greater than that of ordinary cars, the roof is lowered a corresponding amount so that the height of the car is, as in my patent previously referred to, small as compared with the height of ordinary subway, surface, or other cars.

The frame of the car body may be of the girder construction, as disclosed in my patent, which, together with the shape and design of the extensions 12, give the car great strength and rigidity. It may be here stated that a car constructed along the lines disclosed in this application and in my prior patent has been loaded to full passenger carrying capacity with no perceptible give or sagging at the center of the car.

Preferably, the seats 19 are arranged transversely of the car and facing each other, the seats extending from one side of the car body to the other. With this arrangement, no aisle space whatever need be provided, and the ingress and egress of the passengers may be rapidly effected by means of sliding doors 20 arranged in the sides of the car body opposite the spaces between the pairs of adjacent seats, the door and also window spaces being permitted by the girder construction previously referred to.

The motorman's compartment, and in this case, compartments, since I have shown a compartment at each end of the car body, are arranged in the extensions 12 at the ends of the car body, the sides and top of the car body being prolonged so as to form the sides and the roof of the compartments. The front of each compartment may be closed by one or more panes of glass shown at 21.

In order that sufficient space may be provided for the motorman without necessitating an increase in the height of the car, each compartment is extended downwardly, as shown at 22, between the wheels of the corresponding truck rearwardly of the bolsters 13 and 14, each compartment extending downwardly to a suitable point above the rear axle of the truck. Each compartment is also provided rearwardly of the downward extension 22 with a seat 23 which preferably extends the width of the compartment. In order that the extensions 22 of the compartments may not interfere with the movements of the truck bolsters 14, the forward portions of the extensions are inclined rearwardly from the center, as shown best in Fig. 3.

By extending the motorman's compartment downward between the wheels of the truck and by providing a seat across the compartment just above the rear wheels of the truck, there is ample space, without increasing the height of the car beyond that necessitated for the needs of the passengers, for the motorman to be comfortably seated and to control the car without being at all cramped and without being hampered in any manner. The controller, brake and other operating members are not shown, but it will be understood that they will be within convenient reach of the motorman when occupying the seat 23.

Preferably, the frame of the car is extended forwardly to or beyond the forward wheels of each truck and these portions are provided with the draft rigging and bumper mechanism shown at 24.

Having thus described my invention, what I claim is:

1. A railway car comprising a pair of trucks, a car body supported by and extending downward between the trucks, and a motorman's compartment at the end of the car body and extending downward between the wheels of the truck.

2. A railway car comprising a pair of trucks, a car body located wholly between the trucks, and extending downward in proximity to the track, said car body having at its ends supporting extensions which are connected to the trucks, and a motorman's compartment formed in one of said extensions, said compartment projecting downwardly between the wheels of the truck.

3. A railway car comprising a pair of trucks, a car body supported wholly between the trucks and provided at its ends with supporting extensions connected to the trucks, and a motorman's compartment at the end of the car body, said compartment comprising a portion extending downwardly between the wheels of the truck, and a seat located above the wheels of the truck.

4. A railway car comprising a pair of trucks, a car body supported wholly between the trucks and projecting downwardly in proximity to the track, said car body having at its ends supporting extensions which are connected to the trucks, a motorman's compartment formed in one of said extensions, the sides and roof of the car body being prolonged so as to form the sides and roof of the compartment, said compartment having a portion extending downwardly between the wheels of a truck, and having a seat arranged rearwardly of said downward extension above the wheels of the truck.

In testimony whereof, I hereunto affix my signature in the presence of two witnesses.

ANTOINE B. du PONT.

Witnesses:
H. R. SULLIVAN,
A. F. KWIS.